US012724581B2

(12) United States Patent
Ishii

(10) Patent No.: US 12,724,581 B2
(45) **Date of Patent: *Sep. 1, 2026**

(54) IMPLEMENTING SEAMLESS INTERACTIONS ACROSS EXTENDED REALITY (XR) AND NON-XR PLATFORMS

(71) Applicant: Lemon Inc., Grand Cayman (KY)

(72) Inventor: Koken Ishii, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/968,932

(22) Filed: Dec. 4, 2024

(65) Prior Publication Data

US 2025/0094111 A1 Mar. 20, 2025

Related U.S. Application Data

(63) Continuation of application No. 18/205,378, filed on Jun. 2, 2023, now Pat. No. 12,190,009.

(51) Int. Cl.

| | |
|---|---|
| ***G06F 3/14*** | (2006.01) |
| ***G06F 3/01*** | (2006.01) |
| ***G06F 3/04815*** | (2022.01) |
| ***G06F 3/0486*** | (2013.01) |

(52) U.S. Cl.

CPC ............ *G06F 3/1423* (2013.01); *G06F 3/011* (2013.01); *G06F 3/017* (2013.01); *G06F 3/04815* (2013.01); *G06F 3/0486* (2013.01)

(58) Field of Classification Search

CPC ........ G06F 3/1423; G06F 3/011; G06F 3/017; G06F 3/04815; G06F 3/0486

See application file for complete search history.

(56) References Cited

U.S. PATENT DOCUMENTS

| | | | |
|---|---|---|---|
| 10,922,892 B1 | 2/2021 | Bhushan et al. | |
| 2018/0005443 A1* | 1/2018 | Poulos | G06F 3/017 |
| 2019/0004684 A1 | 1/2019 | Pahud et al. | |
| 2023/0237752 A1 | 7/2023 | Elhadad et al. | |

* cited by examiner

*Primary Examiner* — Towfiq Elahi

(74) *Attorney, Agent, or Firm* — BakerHostetler

(57) ABSTRACT

A connection may be established between an extended reality (XR) platform and a non-XR platform. User input may be received via one of XR and non-XR devices comprised in the XR and non-XR platforms. Position information associated with the user input may be converted to be executable by an other one of the XR and non-XR devices. Controls may be implemented across the XR and non-XR platforms without switching the input mechanism associated with the one of the XR and non-XR devices to an input mechanism associated with the other one of the XR and non-XR devices.

20 Claims, 12 Drawing Sheets

400
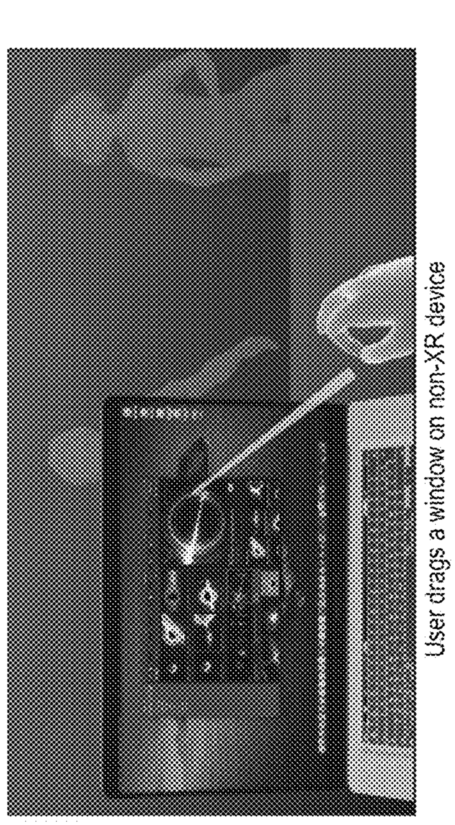
User drags a window on non-XR device
User continues to drag the window into XR space
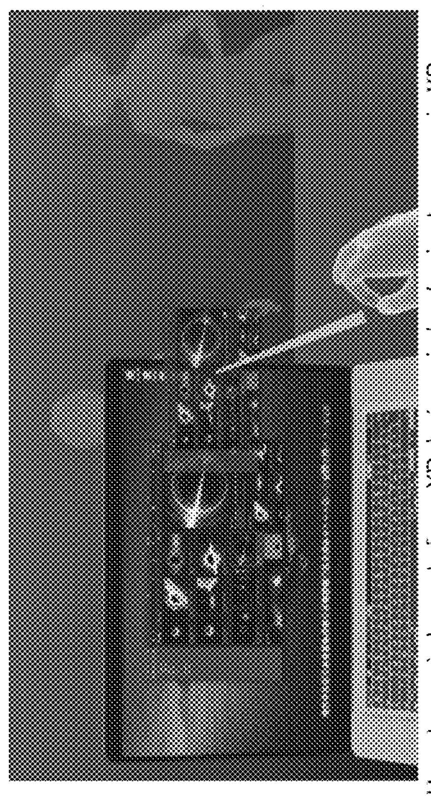
User drags window out of non-XR device, window begins to appear in XR space
User finishes dragging, window appears in XR space
FIG. 4

500
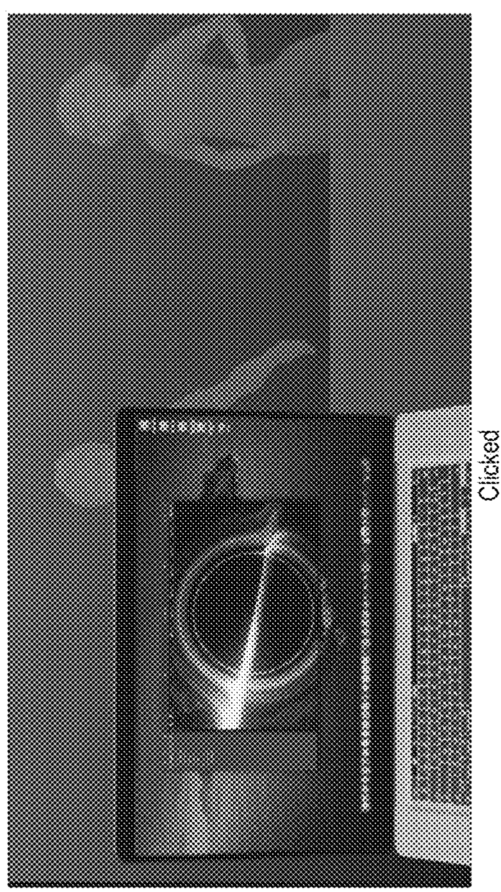
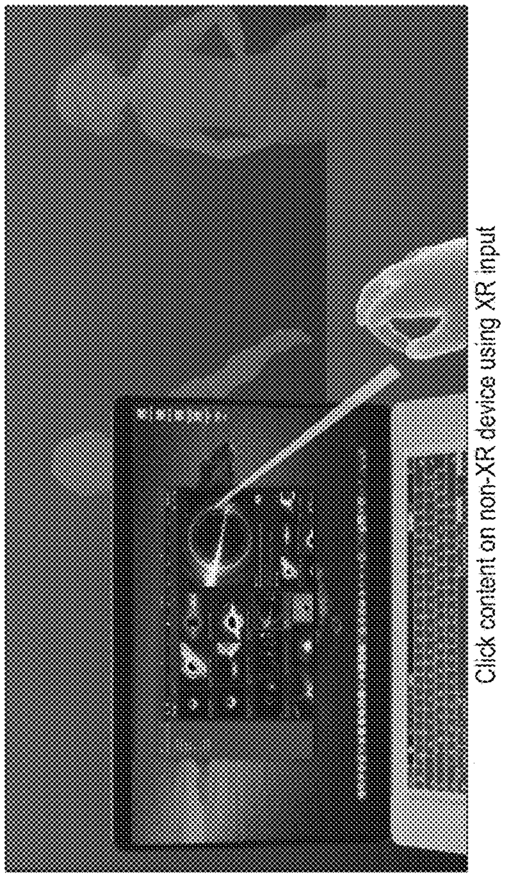
FIG. 5

600
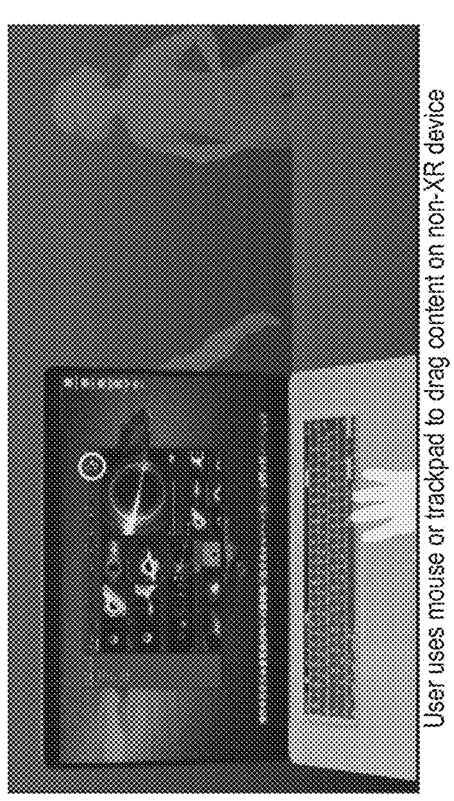
User uses mouse or trackpad to drag content on non-XR device
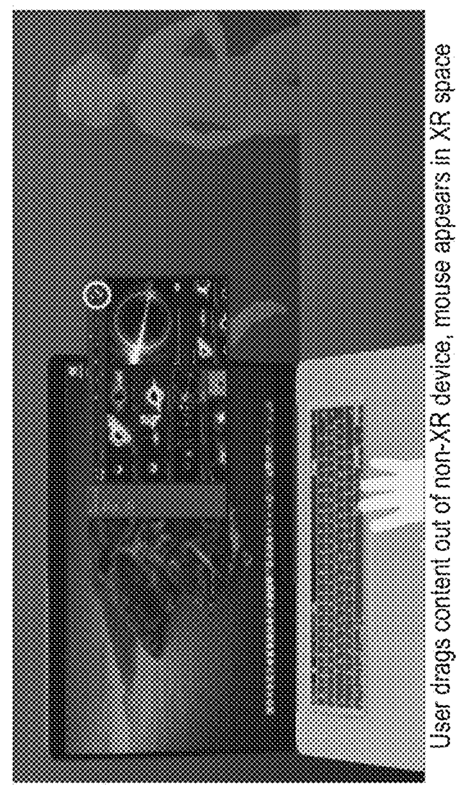
User drags content out of non-XR device, mouse appears in XR space
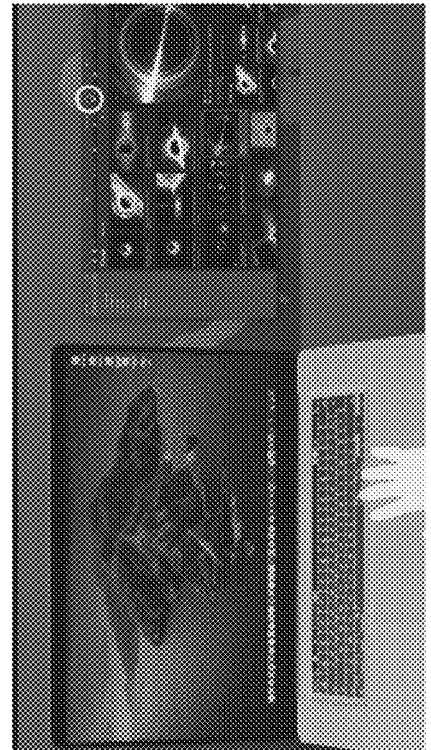
Content on non-XR device dragged into XR space
User continues to user mouse to control content in XR space
FIG. 6

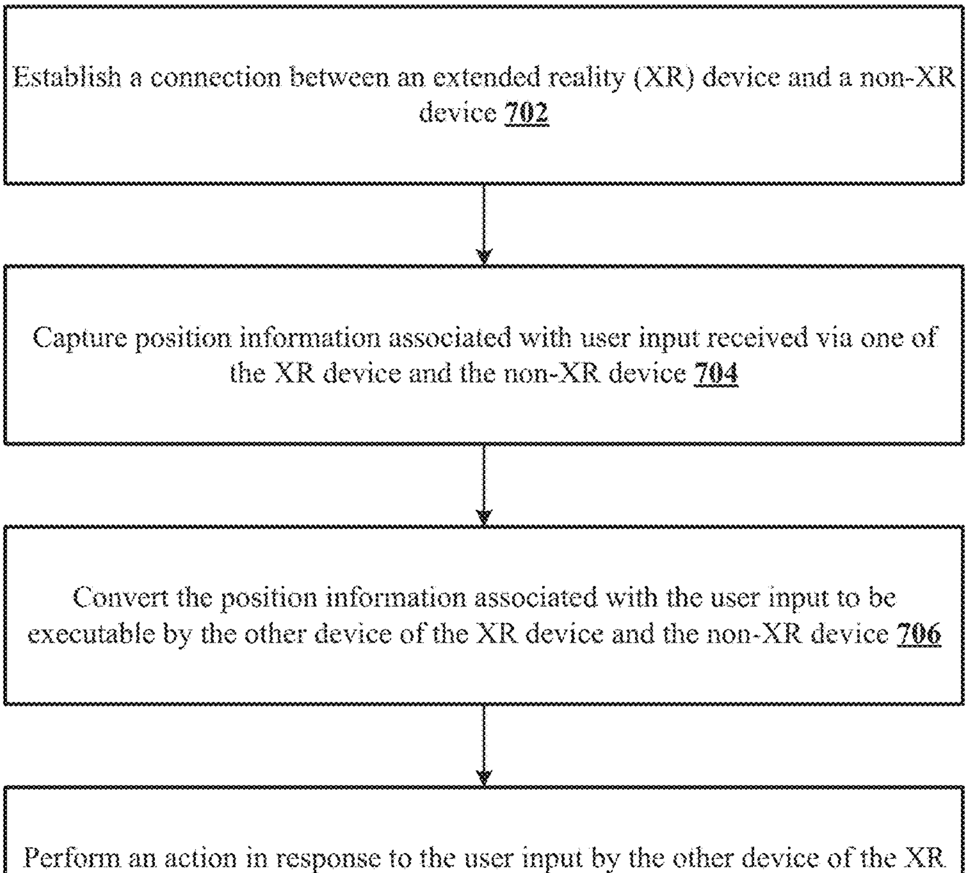
FIG. 7

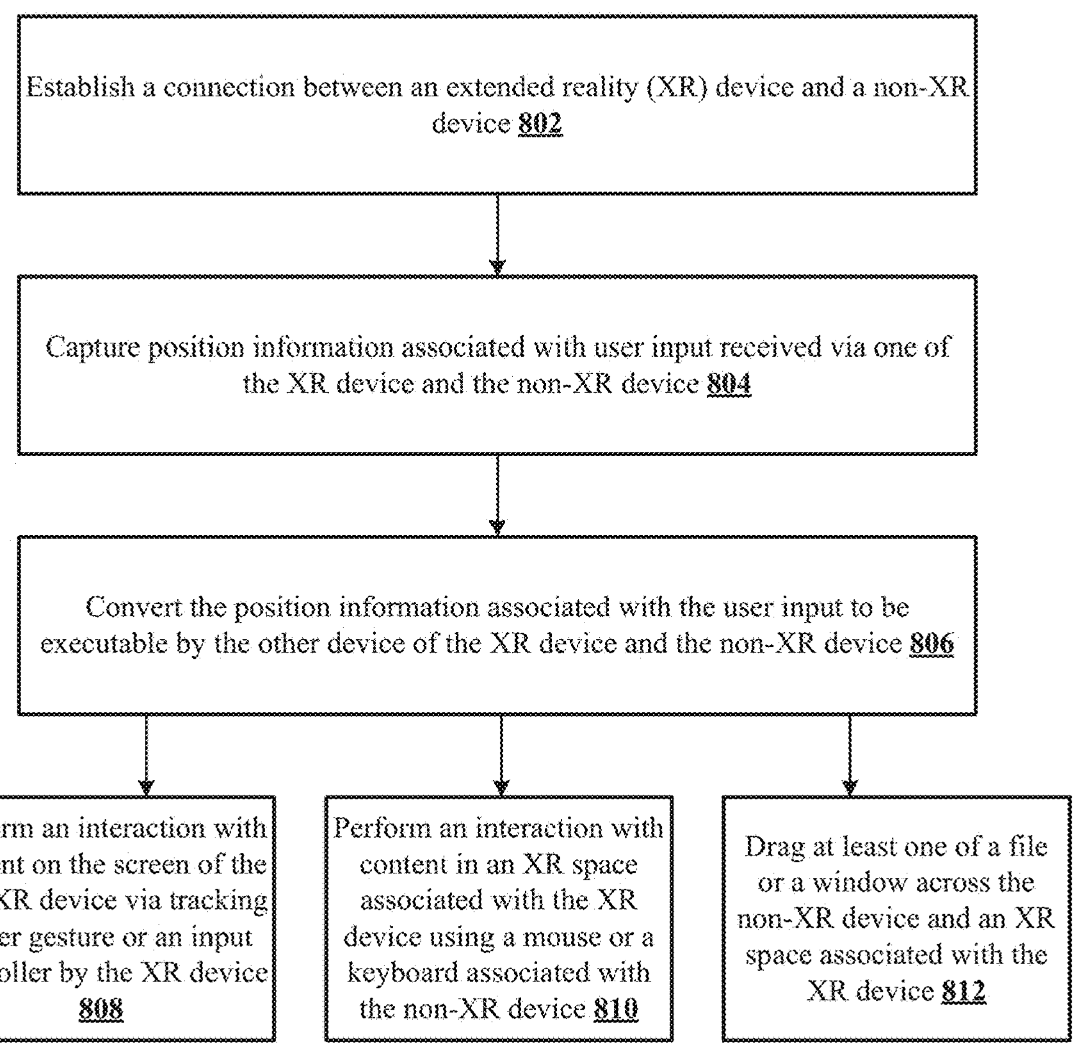
FIG. 8

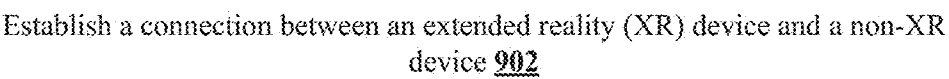
Stream screen recordings of the non-XR device into an XR space associated with the XR device 904
FIG. 9

Receive user input via tracking a user gesture or an input controller by an XR device 1002

Determine a hit point of the user input ray casting on a two-dimensional (2D) screen in an XR space associated with the XR device and corresponding to screen recordings of a non-XR device streamed into the XR space 1004

Perform, by the non-XR device, an action in response to the user input received by the XR device based on 2D coordinates of the hit point 1006

FIG. 10

Receive user input via a mouse or a keyboard associated with a non-XR device 1102

Convert position information associated with the user input to a three-dimensional (3D) spherical coordinate system corresponding to an XR space associated with an XR device 1104

Perform, by the XR device, an action in response to the user input received via the non-XR device based on the converted position information in the 3D spherical coordinate system 1106

FIG. 11

IMPLEMENTING SEAMLESS INTERACTIONS ACROSS EXTENDED REALITY (XR) AND NON-XR PLATFORMS

CROSS-REFERENCE TO RELATED APPLICATION

The present application is a continuation of U.S. patent application Ser. No. 18/205,378 filed on Jun. 2, 2023, which is incorporated herein by reference in its entirety.

BACKGROUND

Extended reality (XR) technologies may enhance or replace the real-world environment. For example, XR technologies may display virtual objects in the real-world and/or virtual environments. As XR devices become more prevalent, people continue to desire new ways for using XR devices.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4 shows an example process for dragging digital content across XR and non-XR platforms using XR input which may be in accordance with the present disclosure.

FIG. 5 shows an example process for using an XR device to interact with content on a non-XR device which may be in accordance with the present disclosure.

FIG. 6 shows an example process for controlling content across non-XR and XR platforms using a non-XR input which may be in accordance with the present disclosure.

FIG. 7 shows an example method for implementing seamless interactions across XR and non-XR platforms which may be in accordance with the present disclosure.

FIG. 8 shows another example method for implementing seamless interactions across XR and non-XR platforms which may be in accordance with the present disclosure.

FIG. 9 shows another example method for implementing seamless interactions across XR and non-XR platforms which may be in accordance with the present disclosure.

FIG. 10 shows another example method for implementing seamless interactions across XR and non-XR platforms which may be in accordance with the present disclosure.

FIG. 11 shows another example method for implementing seamless interactions across XR and non-XR platforms which may be in accordance with the present disclosure.

DETAILED DESCRIPTION OF ILLUSTRATIVE EMBODIMENTS

Figure 1:
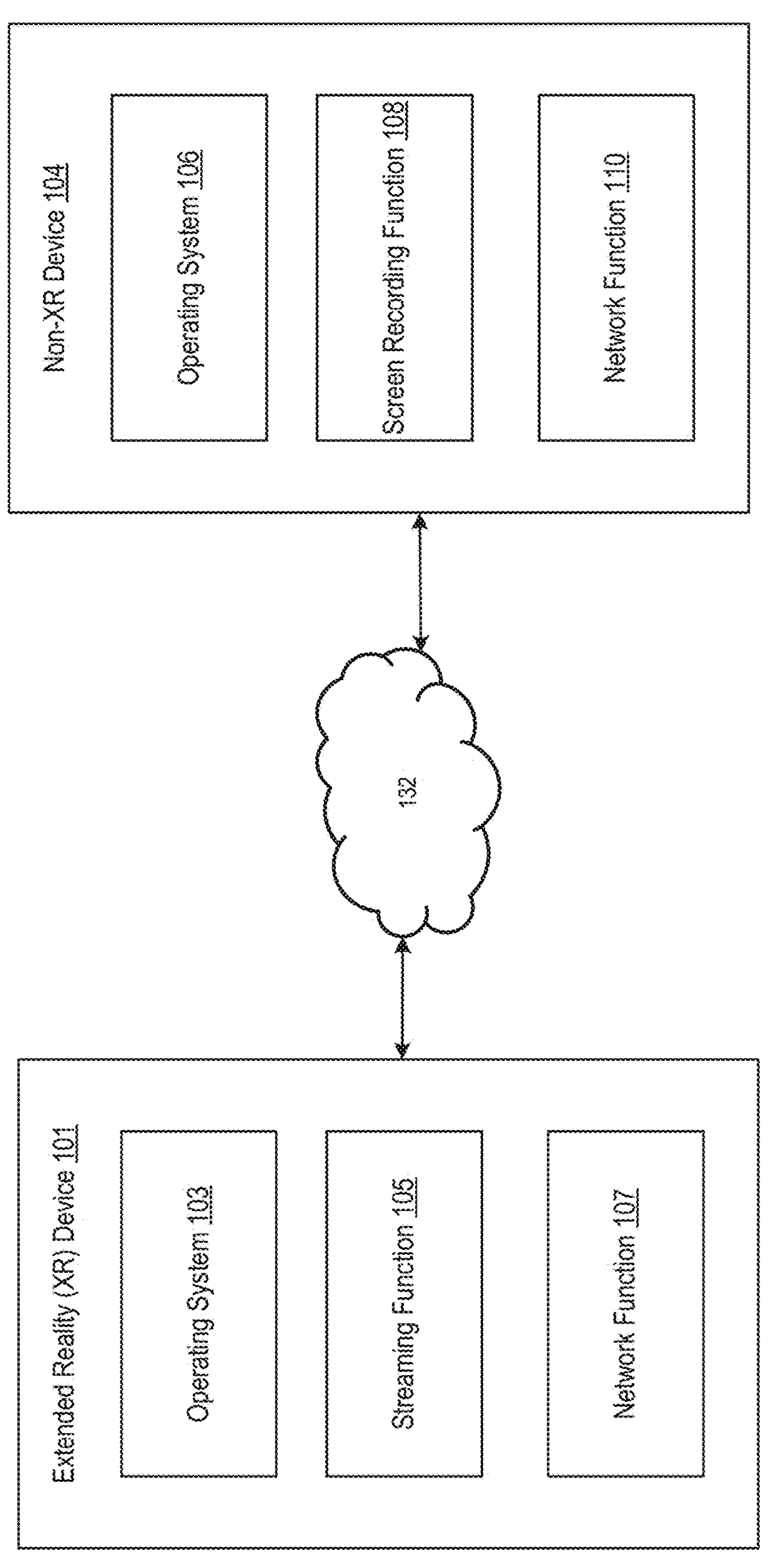
FIG. 1 shows an example system for implementing seamless interactions across extended reality (XR) devices and non-XR devices which may be in accordance with the present disclosure.

Extended Reality (XR) devices are becoming increasingly prevalent. XR devices may be used to enhance or replace the "real" view of the world. To enhance or replace the real view of the world, XR devices may overlay or immerse text or graphics into real-world and/or virtual environments to create a new XR space (e.g., virtual world, digital world, XR display). An XR device may comprise, for example, a wearable device (e.g., a headset, goggles, glasses, etc.). A user may wear the XR device to access the XR space. For example, if a user puts on a XR headset or pair of goggles, the user may be able to be able to view (e.g., be immersed in) the XR space. The user may be able to navigate the XR space using hand gestures and/or controllers associated with the XR device.

An XR device may be an augmented reality (AR) device, a virtual reality (VR) device, or a mixed reality (MR) device. AR devices may be configured to enhance (e.g., not entirely replace) the "real" view of the world. AR devices may be configured to enhance the real view of the world by overlaying the real view of the world with computer-generated information or graphics. Thus, users of AR devices may be immersed in an environment including both real-world and virtual objects. The users of AR devices may not be isolated from the real world and may still interact with and see what is going on in the real world. Conversely, VR devices may completely replace the real view of the world, immersing users within an entirely virtual environment. Users of VR devices may be isolated from the real world and may not be able to interact with and see what is going on in the real world. MR devices may be configured to enhance the real view of the world by overlaying the real view of the world with computer-generated information or graphics. However, unlike in the virtual world created by AR devices, the digital and real-world objects in the virtual world created by MR devices may interact with each other in real-time.

XR devices may function separately from non-XR devices, such as personal computers (PCs), laptops, and mobile phones. Users may want to interact with content or files on both XR and non-XR platforms or transfer content or files between the two platforms. But it is difficult to seamlessly interact with both XR devices and non-XR devices since they use different input methods. For example, a PC may use a keyboard and mouse for input and a mobile phone may use a touch screen for input, while an XR device may use hand gestures or XR controllers for input. A user may need to switch between different input methods for different devices. Thus, techniques that enable users to interact across XR and non-XR platforms without switching input methods are desirable.

Described herein are techniques for implementing seamless interactions across XR and non-XR platforms. Using the techniques described herein, gestures and inputs received by controllers of XR devices may be detected on non-XR devices, such as PCs or mobile devices, thereby enabling interactions with non-XR devices using gestures and inputs tracked by XR devices. Cross-platform interaction may be enabled by projecting the screen of non-XR devices into XR space. Using the techniques described herein, non-XR input received at non-XR devices may be detected by XR devices, thus enabling interactions in XR space using keyboards, mouses and/or other input means of non-XR devices.

FIG. 1 is an example system 100 for implementing seamless interactions across XR and non-XR platforms. The system 100 may comprise at least one XR device 101 and at least one non-XR device 104. The XR device 101 and the non-XR device 104 may communicate with each other via one or more networks 132. The network(s) 132 may comprise a variety of network devices, such as routers, switches, multiplexers, hubs, modems, bridges, repeaters, firewalls, proxy devices, and/or the like. The network(s) 132 may comprise physical links, such as coaxial cable links, twisted pair cable links, fiber optic links, a combination thereof, and/or the like. The network(s) 132 may comprise wireless links, such as cellular links, satellite links, Wi-Fi links and/or the like.

The XR device 101 may comprise any type of XR device. The XR device 101 may comprise an AR device, a VR device, or an MR device. As described above, an AR devices may be configured to enhance (e.g., not entirely replace) the "real" view of the world by overlaying the real view of the world with computer-generated information or graphics. VR devices may completely replace the real view of the world, immersing users within an entirely virtual environment. Like AR devices, MR devices may be configured to enhance the real view of the world by overlaying the real view of the world with computer-generated information or graphics. However, unlike in the virtual world created by AR devices, the digital and real-world objects in the virtual world created by MR devices may interact with each another in real-time.

The XR device 101 may comprise a wearable device. For example, the XR device 101 may comprise one or more of a headset, goggles, or glasses. A user may wear the XR device to access the XR space or display created by the XR device. For example, if a user puts on an XR headset or pair of goggles, the user may be able to be able to view (e.g., be immersed in) the XR space.

The XR device 101 may be configured to receive one or more types of XR input. The XR device 101 may be configured to receive one or more types of XR input from one or more users. The XR inputs may comprise one or more hand gestures, bodily movements, and/or controllers associated with the XR device. For example, the XR device 101 may be configured to track users' hand movements using display hardware, thereby allowing the users to interact with digital content displayed in XR space using hand gestures.

The XR device 101 may comprise an operating system 103. The operating system 103 comprises software configured to manage the memory and processes associated with the XR device 101. The operating system 103 may be configured to manage the software and hardware associated with the XR device 101. The XR device 101 may comprise a streaming function 105. The streaming function 105 may be configured to project (e.g., stream) content displayed by a non-XR device (e.g., the non-XR device 104) in XR space. By projecting content displayed by a non-XR device in XR space, a user of the XR device 101 may be able to view a virtual replication of the screen or interface of the real world non-XR device. The XR device 101 may comprise a network function 107. The network function 107 may be configured to send information (e.g., data) to the non-XR device 104. For example, the network function 107 may be configured to send information (e.g., data) to a network function installed on the non-XR device 104. The network function 107 may be configured to receive information (e.g., data) from the non-XR device 104. For example, the network function 107 may be configured to receive information (e.g., data) from a network function of the non-XR device 104.

The non-XR device 104 may comprise any type of computing device that is not an XR device, such as a mobile device, a tablet device, laptop, a desktop computer, a smart television or other smart device, a gaming device, a set top box, digital streaming device, robot, and/or the like. The non-XR device 104 may be associated with one or more users.

The non-XR device 104 may be configured to receive one or more types of non-XR input. The non-XR device 104 may be configured to receive one or more types of non-XR input from one or more users. The non-XR inputs may comprise one or more of mouse clicks, trackpad inputs, keyboard inputs, and/or touch screen inputs. For example, users of the non-XR device 104 may use a mouse, trackpad, keyboard, and/or touch screen to interact with content on an interface or screen of the non-XR device 104.

The non-XR device 104 may comprise an operating system 106. The operating system 106 comprises software configured to manage the memory and processes associated with the non-XR device 104. The operating system 106 may be configured to manage the software and hardware associated with the non-XR device 104. The non-XR device 104 may comprise a screen recording function 108. The screen recording function 108 may be configured to record (e.g., capture) content displayed on a screen or interface of the non-XR device 104. The recorded content may be sent to the XR device 101, such as to the streaming function 105. The recorded content may be projected by the XR device 101 in XR space. The non-XR device 104 may comprise a network function 110. The network function 110 may be configured to send information (e.g., data) to the XR device 101. For example, the network function 110 may be configured to send information (e.g., data) to the network function 107 installed on the XR device 101. The network function 110 may be configured to receive information (e.g., data) from the XR device 101. For example, the network function 110 may be configured to receive information (e.g., data) from the network function 107 installed on the XR device 101.

If a connection is established between the XR device 101 and the non-XR device 104, such as via the network(s) 132, it may be possible to implement seamless interactions between the XR device 101 and the non-XR device 104, without requiring a user to switch between different inputs methods for the different devices.

Figure 2:
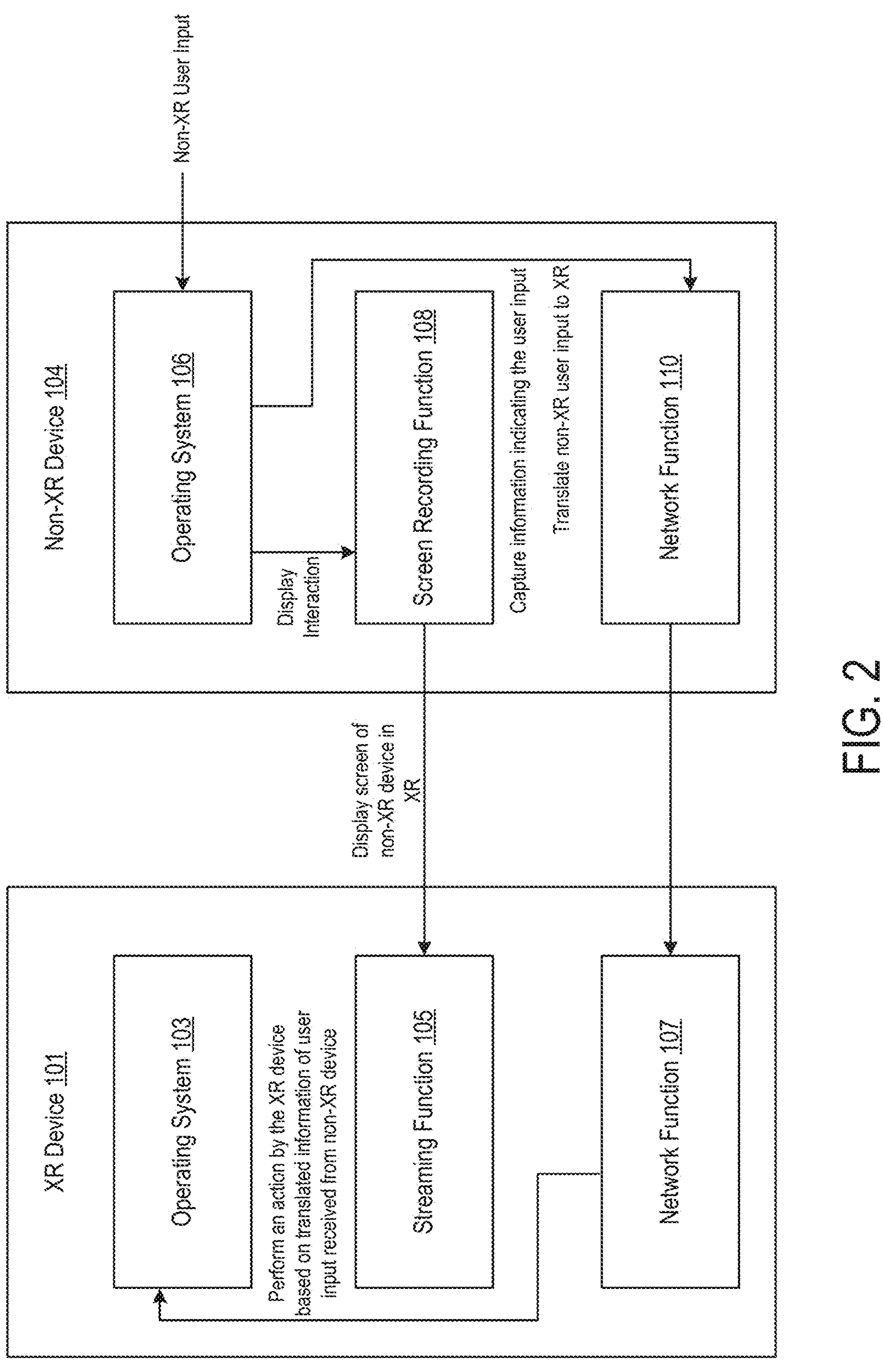
FIG. 2 shows an example system for implementing seamless interactions across XR and non-XR platforms which may be in accordance with the present disclosure.

FIG. 2 is an example system 200 for implementing seamless interactions between the XR device 101 and the non-XR device 104. One or more user inputs may be received via the non-XR device 104. The user input(s) may be processed by the operating system 106 of the non-XR device 104. The user input(s) may comprise any non-XR user input(s), such as one or more of a mouse click, a trackpad interaction, a keyboard interaction, a touch screen interaction, and/or any other user input receivable by the non-XR device 104.

The screen recording function 108 of the non-XR device 104 may share or send recordings of the screen or interface of the non-XR device 104 to the XR device 101. The XR device 101 may display the screen or interface of the non-XR device 104 in XR space. For example, the streaming function 105 may stream the screen or interface of the non-XR device 104 in XR space. The non-XR user input may indicate that the user wants to drag content (e.g., a window or file) off the screen or interface of the non-XR device 104 into XR space (e.g., MR space associated with or generated by the XR device 101). The user may drag content out of or off the screen or interface of the non-XR device 104, and the dragging input may extend into XR space. As the content crosses the border between the screen or interface of the non-XR device 104 and XR space, the content may begin to appear in XR space. The XR space will function as an extended display of the non-XR device 104. If the non-XR device 104 is associated with a cursor (e.g., a mouse cursor, trackpad cursor, etc.), the cursor may appear in XR space as the cursor is dragged across the border between the screen or interface of the non-XR device 104 and XR space.

The non-XR user input(s) may be used in XR space. For example, the user may continue to user the non-XR user input(s), such as the mouse, trackpad, keyboard, or touch-screen, to control or interact with the content in XR space. The non-XR user input(s) may be configured to perform the same functions across the non-XR device 104 and XR space, facilitating seamless movement across the two platforms.

Position information associated with a non-XR user input received via the non-XR device 104 may be captured. The position information may indicate a location on the screen of the non-XR device 104 displayed in XR space. The location may, for example, indicate two-dimensional (2D) coordinates associated with the non-XR user input. The position information may be converted to user input executable by the XR device 101. Converting the position information associated with the non-XR user input to XR user input may comprise converting the 2D coordinates associated with the non-XR user input to a three-dimensional (3D) spherical coordinate system. The 3D spherical coordinates system may correspond to an XR space associated with the XR device 101. The XR device 101 may be configured to perform an action in response to the non-XR user input. To perform an action in response to the non-XR user input, the XR device 101 may perform the action based on the converted position information in the 3D spherical coordinate system. Thus, non-XR input received via non-XR devices may be detected and executed by XR devices, enabling typing and mouse interaction in XR space using non-XR inputs.

Figure 3:
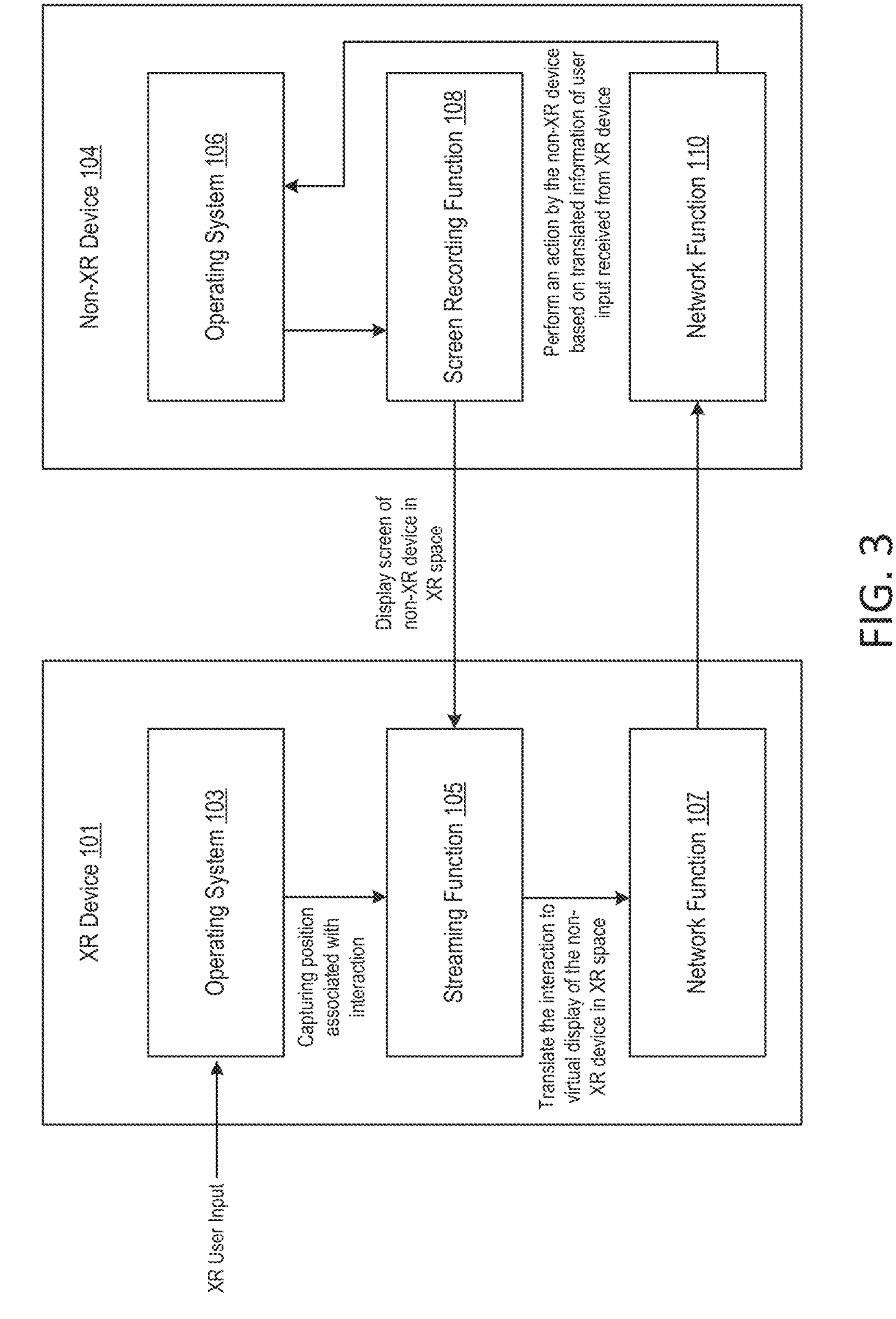
FIG. 3 shows an example system for implementing seamless interactions across XR and non-XR platforms which may be in accordance with the present disclosure.

FIG. 3 is an example system 300 for implementing seamless interactions between the XR device 101 and the non-XR device 104. One or more user inputs may be received via the XR device 101. The user input(s) may be processed by the operating system 103 of the XR device 101. The user input(s) may comprise XR user input(s), such as one or more of a hand gesture, bodily movement, XR controller interaction, and/or any other user input receivable by the XR device 101.

The screen recording function 108 may share or send recordings of the screen or interface of the non-XR device 104 to the XR device 101. The XR device 101 may display the screen or interface of the non-XR device 104 in XR space. For example, the streaming function 105 may stream the screen or interface of the non-XR device 104 in XR space. XR user input received at the XR device 101 may indicate that the user wants to drag content (e.g., a window or file) on the screen or interface of the non-XR device 104 into XR space (e.g., MR space associated with or generated by the XR device 101). If the user input indicate that the user wants to drag content (e.g., a window or file) off the screen or interface of the non-XR device 104, the position of the target of the drag gesture on the projected screen or interface of the non-XR device 104 may be determined. Thus, the user may drag content out of or off the screen or interface of the non-XR device 104. As the content crosses the border between the screen or interface of the non-XR device 104 and XR space, the content may begin to appear in XR space. The XR space may function as an extended display of the non-XR device 104.

The XR device 101 may be configured to detect interactions with the projection of the screen or interface of the non-XR device 104 in XR space using controllers and/or hand-tracking. The streaming function 105 may be configured to communicate with the non-XR device 104. The streaming function 105 may be configured to capture position information associated with the interaction with the projection of the screen or interface of the non-XR device 104 in XR space. Capturing the position information may comprise determining a hit point of the user input ray casting on a two-dimensional (2D) screen in the XR space corresponding to screen recordings of the non-XR device streamed into the XR space. The position information may be converted to be executable by the non-XR device 104. The non-XR device 104 may be configured to perform an action in response to the XR user input.

In embodiments, XR user input(s) received at the XR device 101 may indicate that the user wants to click on (e.g., select) content on the screen or interface of the actual non-XR device 104 displayed in XR space, such as in MR space. The XR device 101 may be configured to detect interactions with the screen or interface of the non-XR device 104 in XR space using controllers and/or hand-tracking. The streaming function 105 may be configured to capture position information associated with the interaction with the screen or interface of the non-XR device 104 in XR space. Capturing the position information may comprise determining a hit point of the user input ray casting on a two-dimensional (2D) screen in the XR space corresponding to screen recordings of the non-XR device streamed into the XR space. The position information may be converted to be executable by the non-XR device 104. The non-XR device 104 may be configured to perform an action in response to the XR user input.

FIG. 4 shows an example process 400 for dragging digital content across XR and non-XR platforms using XR input. A user may want to drag a window or screen displayed on a non-XR device to XR space so that the XR space may function as an extended display of the non-XR device. The XR device may be a MR device. The actual screen or interface of the non-XR device may be displayed in MR space.

XR user input(s) may be received by an XR device. The XR user input(s) may indicate that the user wants to drag content (e.g., a window or file) on the screen or interface of the non-XR device into XR space. The user input(s) may indicate that the user wants to drag content (e.g., a window or file) on the screen or interface of the non-XR device into MR space, such that MR space functions as an extended display of the non-XR device. As the user drags the window out of the non-XR device screen, the window may begin to appear in XR space. The position of the target of the dragging gesture on the screen or interface of the non-XR device may be detected. The user may drag content out of or off the screen or interface of the non-XR device. As the content crosses the border between the screen or interface of the non-XR device and XR space, the content may begin to appear in XR space. The window may appear in XR space when the user finishes dragging the window in XR space. The user may use XR inputs to interact with the window in XR space. The XR device may be configured to detect interactions with the projection of the screen or interface of the non-XR device in XR space using controllers and/or hand-tracking. The streaming function may be configured to communicate with the non-XR device. The streaming function may be configured to capture position information associated with the interaction with the projection of the screen or interface of the non-XR device in XR space. Capturing the position information may comprise determining a hit point of the user input ray casting on a two-dimensional (2D) screen in the XR space corresponding to screen recordings of the non-XR device streamed into the XR space. The position information may be converted to be executable by the non-XR device. The non-XR device may be configured to perform an action associated with the window displayed on the actual non-XR device in response to the XR user input. The screen recordings of the non-XR device streamed into the XR space may indicate that this action was taken.

FIG. 5 shows an example process 500 for using an XR device to interact with content on a non-XR device. A XR device may receive user input. The user input may be XR user input. The user input may indicate that the user wants to click on (e.g., select) content on the screen or interface of the actual non-XR device displayed in XR space. For example, the XR device may be a MR device. The actual screen or interface of the non-XR device may be blended in MR space.

The XR device may be configured to detect interactions with the screen or interface of the non-XR device in XR space using controllers and/or hand-tracking. A streaming function associated with the XR device may be configured to capture position information associated with the interaction with the screen or interface of the non-XR device in XR space. Capturing the position information may comprise determining a hit point of the user input ray casting on the screen of the non-XR device in XR space (e.g., MR space). The position information of the hit point may be executable by the non-XR device. The non-XR device may be configured to perform an action in response to the XR user input. For example, the non-XR device may be configured to cause the content to be clicked on or selected.

FIG. 6 shows an example process 600 for controlling content across non-XR and XR platforms using a non-XR input. A user may use a non-XR input to drag content on the screen of a non-XR device. The user may want to drag the content of the screen of the non-XR device into XR space, such that XR space functions as an extended display of the non-XR device. For example, the XR device may be a MR device. The actual screen or interface of the non-XR device may be blended in MR space. The non-XR user input may indicate that the user wants to drag content (e.g., a window or file) of the screen or interface of the non-XR device into MR space, such that MR space functions as an extended display of the non-XR device.

The non-XR device may receive non-XR user input. The non-XR user input may indicate that the user wants to drag content (e.g., a window or file) of the screen or interface of the non-XR device into XR space. If the user input(s) indicate that the user wants to drag content (e.g., a window or file) off the screen or interface of the non-XR device and into XR space, the non-XR device may display the content being dragged off the screen or interface of the non-XR device. As the user drags content off the screen of the non-XR device, the mouse cursor associated with the non-XR device may appear in XR space.

The screen recording function may share or send recordings of the screen or interface of the non-XR device to XR space associated with the XR device. The XR device may display the screen or interface of the non-XR device in XR space. For example, the streaming function may stream the screen or interface of the non-XR device in XR space. Thus, the user may drag content out of or off the screen or interface of the non-XR device, and the dragging gesture may extend into XR space. As the content crosses the border between the screen or interface of the non-XR device and XR space, the content may begin to appear in XR space. The XR space will function as an extended display of the non-XR device. If the non-XR device is associated with a cursor (e.g., a mouse cursor, trackpad cursor, etc.) the cursor may appear in XR space as the cursor is dragged across the border between the screen or interface of the non-XR device and XR space.

The non-XR user input(s) may be used in XR space. For example, the user may continue to user the non-XR user input(s), such as the mouse, trackpad, keyboard, or touch-screen, to control or interact with the content in XR space. The non-XR user input(s) may be configured to perform the same functions across the non-XR device 104 and XR space, facilitating seamless movement across the two platforms.

FIG. 7 illustrates an example process 700. The process 700 may be performed for implementing seamless interactions across XR and non-XR platforms. Although depicted as a sequence of operations in FIG. 7, those of ordinary skill in the art will appreciate that various embodiments may add, remove, reorder, or modify the depicted operations.

At 702, a connection may be established between an extended reality (XR) device and a non-XR device. The XR device may comprise one of an AR device, a VR device, or an MR device. The XR device may comprise a wearable device. For example, the XR device may comprise one or more of a headset, goggles, or glasses. A user may wear the XR device to access the XR space or display created by the XR device. For example, if a user puts on an XR headset or pair of goggles, the user may be able to be able to view (e.g., be immersed in) the XR space. The XR device may be configured to receive one or more types of XR input. The XR device may be configured to receive one or more types of XR input from one or more users. The XR inputs may comprise one or more hand gestures, bodily movements, and/or controllers associated with the XR device. For example, the XR device may be configured to track users' hand movements using display hardware, thereby allowing the users to interact with digital content displayed in XR space using hand gestures.

The non-XR device may comprise any type of computing device that is not an XR device, such as a mobile device, a tablet device, laptop, a desktop computer, a smart television or other smart device, a gaming device, a set top box, digital streaming device, robot, and/or the like. The non-XR device may be associated with one or more users. The non-XR device may be configured to receive one or more types of non-XR input. The non-XR device may be configured to receive one or more types of non-XR input from one or more users. The non-XR inputs may comprise one or more of mouse clicks, trackpad inputs, keyboard inputs, and/or touch screen inputs. For example, users of the non-XR device may use a mouse, trackpad, keyboard, and/or touch screen to interact with content on an interface or screen of the non-XR device.

One of the XR device and the non-XR device may receive user input. For example, the XR device may receive XR user input. Alternatively, the non-XR device may receive non-XR user input. At 704, position information may be captured. The position information may be associated with the user input received via one of the XR device and the non-XR device. If the user input is received by the non-XR device, the position information may indicate a location on the screen of the non-XR device blended/displayed in XR space. The location may, for example, indicate 2D coordinates associated with the non-XR user input. If the user input is received by the XR device, the position information may indicate a location associated with the user input ray casting on a 2D screen in the XR space corresponding to screen recordings of the non-XR device streamed into the XR space.

At 706, the position information associated with the user input may be converted. The position information may be converted to be executable by the other device of the XR device and the non-XR device. If the user input is received by the non-XR device, the position information may be converted to be executable by the XR device. If the user input is received by the XR device, the position information may be converted to be executable by the non-XR device. At 708, an action may be performed. The action may be performed in response to the user input by the other device of the XR device and the non-XR device. If the user input is received by the non-XR device, the action may be performed by the XR device. If the user input is received by the XR device, the action may be performed by the non-XR device.

FIG. 8 illustrates an example process 800. The process 800 may be performed for implementing seamless interactions across XR and non-XR platforms. Although depicted as a sequence of operations in FIG. 8, those of ordinary skill in the art will appreciate that various embodiments may add, remove, reorder, or modify the depicted operations.

At 802, a connection may be established between an extended reality (XR) device and a non-XR device. The XR device may comprise one of an AR device, a VR device, or an MR device. The XR device may comprise a wearable device. For example, the XR device may comprise one or more of a headset, goggles, or glasses. A user may wear the XR device to access the XR space or display created by the XR device. For example, if a user puts on an XR headset or pair of goggles, the user may be able to be able to view (e.g., be immersed in) the XR space. The XR device may be configured to receive one or more types of XR input. The XR device may be configured to receive one or more types of XR input from one or more users. The XR inputs may comprise one or more hand gestures, bodily movements, and/or controllers associated with the XR device. For example, the XR device may be configured to track users' hand movements using display hardware, thereby allowing the users to interact with digital content displayed in XR space using hand gestures.

The non-XR device may comprise any type of computing device that is not an XR device, such as a mobile device, a tablet device, laptop, a desktop computer, a smart television or other smart device, a gaming device, a set top box, digital streaming device, robot, and/or the like. The non-XR device may be associated with one or more users. The non-XR device may be configured to receive one or more types of non-XR input. The non-XR device may be configured to receive one or more types of non-XR input from one or more users. The non-XR inputs may comprise one or more of mouse clicks, trackpad inputs, keyboard inputs, and/or touch screen inputs. For example, users of the non-XR device may use a mouse, trackpad, keyboard, and/or touch screen to interact with content on an interface or screen of the non-XR device.

One of the XR device and the non-XR device may receive user input. For example, the XR device may receive XR user input. Alternatively, the non-XR device may receive non-XR user input. At 804, position information may be captured. The position information may be associated with the user input received via one of the XR device and the non-XR device. If the user input is received by the non-XR device, the position information may indicate a location on the screen of the non-XR device displayed in XR space. The location may, for example, indicate 2D coordinates associated with the non-XR user input. If the user input is received by the XR device, the position information may indicate a location associated with the user input ray casting on a 2D screen in the XR space corresponding to screen recordings of the non-XR device streamed into the XR space.

At 806, the position information associated with the user input may be converted. The position information may be converted to be executable by the other device of the XR device and the non-XR device. If the user input is received by the non-XR device, the position information may be converted to be executable by the XR device. If the user input is received by the XR device, the position information may be converted to be executable by the non-XR device.

At 808, an interaction may be performed across XR and non-XR platforms. In some embodiments, the interaction may be an interaction with content on the screen of the non-XR device. The interaction may be performed in response to receiving user input via the XR device, e.g., receiving the user input via tracking a user gesture or an input controller by the XR device. At 810, an interaction may be performed across XR and non-XR platforms. In other embodiments, the interaction may be with content in an XR space associated with the XR device. The interaction may be performed in response to receiving user input via the non-XR device, e.g., using a mouse or a keyboard associated with the non-XR device. At 812, at least one of a file or a window may be dragged across the non-XR device and an XR space associated with the XR device. In examples, a file, a window and/or an object may be dragged across the non-XR and XR platforms.

FIG. 9 illustrates an example process 900. The process 900 may be performed for implementing seamless interactions across XR and non-XR platforms. Although depicted as a sequence of operations in FIG. 9, those of ordinary skill in the art will appreciate that various embodiments may add, remove, reorder, or modify the depicted operations.

At 902, a connection may be established between an extended reality (XR) device and a non-XR device. The XR device may comprise one of an AR device, a VR device, or an MR device. The XR device may comprise a wearable device. For example, the XR device may comprise one or more of a headset, goggles, or glasses. A user may wear the XR device to access the XR space or display created by the XR device. For example, if a user puts on an XR headset or pair of goggles, the user may be able to be able to view (e.g., be immersed in) the XR space. The XR device may be configured to receive one or more types of XR input. The XR device may be configured to receive one or more types of XR input from one or more users. The XR inputs may comprise one or more hand gestures, bodily movements, and/or controllers associated with the XR device. For example, the XR device may be configured to track users' hand movements using display hardware, thereby allowing the users to interact with digital content displayed in XR space using hand gestures.

The non-XR device may comprise any type of computing device that is not an XR device, such as a mobile device, a tablet device, laptop, a desktop computer, a smart television or other smart device, a gaming device, a set top box, digital streaming device, robot, and/or the like. The non-XR device may be associated with one or more users. The non-XR device may be configured to receive one or more types of non-XR input. The non-XR device may be configured to receive one or more types of non-XR input from one or more users. The non-XR inputs may comprise one or more of mouse clicks, trackpad inputs, keyboard inputs, and/or touch screen inputs. For example, users of the non-XR device may use a mouse, trackpad, keyboard, and/or touch screen to interact with content on an interface or screen of the non-XR device.

The non-XR device may comprise a screen recording function. The screen recording function may be configured to record (e.g., capture) a screen and content displayed on the screen or interface of the non-XR device 104. The screen recordings may be sent to the XR device. The screen recordings may be projected in XR space. At 904, screen recordings of the non-XR device may be streamed. The screen recordings may be streamed into an XR space associated with the XR device. For example, the screen recordings may be streamed into an XR space associated with the XR device by the streaming function.

FIG. 10 illustrates an example process 1000. The process 1000 may be performed for implementing seamless interactions across XR and non-XR platforms. Although depicted as a sequence of operations in FIG. 10, those of ordinary skill in the art will appreciate that various embodiments may add, remove, reorder, or modify the depicted operations.

An XR device may comprise one of an AR device, a VR device, or an MR device. The XR device may comprise a wearable device. For example, the XR device may comprise one or more of a headset, goggles, or glasses. A user may wear the XR device to access the XR space or display created by the XR device. For example, if a user puts on an XR headset or pair of goggles, the user may be able to be able to view (e.g., be immersed in) the XR space. The XR device may be configured to receive one or more types of XR input. The XR device may be configured to receive one or more types of XR input from one or more users. The XR inputs may comprise one or more hand gestures, bodily movements, and/or controllers associated with the XR device. At 1002, user input may be received. The user input may be received via the XR device. The user input may be received via tracking a user gesture or an input controller by the XR device.

The XR device may be configured to detect interactions with the projection of the screen or interface of the non-XR device in XR space using controllers and/or hand-tracking. A streaming function on the XR device may be configured to communicate with a non-XR device. Position information associated with the interaction with the projection of the screen or interface of the non-XR device in XR space, such as hand gesture, may be captured by the XR device. The position information associated with XR input, e.g., hand gesture, may be converted to be executable by the non-XR device. In examples, a hit point of the XR user input (e.g., hand gesture) may be determined by ray casting on a two-dimensional (2D) screen in the XR space corresponding to screen recordings of the non-XR device streamed into the XR space. At 1004, a hit point may be determined. The hit point may be the hit point of the user input ray casting on a two-dimensional (2D) screen in an XR space associated with the XR device and corresponding to screen recordings of a non-XR device streamed into the XR space. The coordinates of the hit point may be used by the non-XR device as the interaction spot on the non-XR screen.

The non-XR device may be configured to perform an action in response to the XR user input (e.g., hand gesture detected by the XR device). At 1006, an action may be performed. The action may be performed by the non-XR device. The action may be performed in response to the user input received by the XR device based on 2D coordinates of the hit point ray casting on the 2D screen (e.g., streamed screen recordings of the non-XR device) in XR space. The action may comprise performing interactions with content on the screen of the non-XR device, dragging files or windows across the XR space and the non-XR device, and so on.

FIG. 11 illustrates an example process 1100. The process 1100 may be performed for implementing seamless interactions across XR and non-XR platforms. Although depicted as a sequence of operations in FIG. 11, those of ordinary skill in the art will appreciate that various embodiments may add, remove, reorder, or modify the depicted operations.

A non-XR device may comprise any type of computing device that is not an XR device, such as a mobile device, a tablet device, laptop, a desktop computer, a smart television or other smart device, a gaming device, a set top box, digital streaming device, robot, and/or the like. The non-XR device may be associated with one or more users. The non-XR device may be configured to receive one or more types of non-XR input. The non-XR device may be configured to receive one or more types of non-XR input from one or more users. The non-XR inputs may comprise one or more of mouse clicks, trackpad inputs, keyboard inputs, and/or touch screen inputs. For example, users of the non-XR device may use a mouse, trackpad, keyboard, and/or touch screen to interact with content on an interface or screen of the non-XR device. At 1102, user input may be received. The user input may be received via a mouse, a keyboard, and/or other input means associated with a non-XR device.

Position information associated with the non-XR user input received via the non-XR device may be captured. The position information may indicate a location on the screen of the non-XR device. The location may, for example, indicate 2D coordinates associated with the non-XR user input. The position information may be converted to user input executable by the XR device. Converting the position information associated with the non-XR user input to XR executable input may comprise converting the 2D coordinates associated with the non-XR user input to 3D spherical coordinate system. At 1104, position information associated with the user input may be converted to a 3D spherical coordinate system. The 3D spherical coordinate system may correspond to an XR space associated with an XR device.

The XR device may be configured to perform an action in response to the non-XR user input. To perform an action in response to the non-XR user input, the XR device may perform the action based on the converted position information in the 3D spherical coordinate system. At 1106, an action may be performed. The action may be performed by the XR device. The action may be performed in response to the user input received via the non-XR device. The action may be performed based on the converted position information in the 3D spherical coordinate system. The action may comprise performing interactions with content in XR space, dragging files or windows across the non-XR device and the XR space, and so on.

Figure 12:
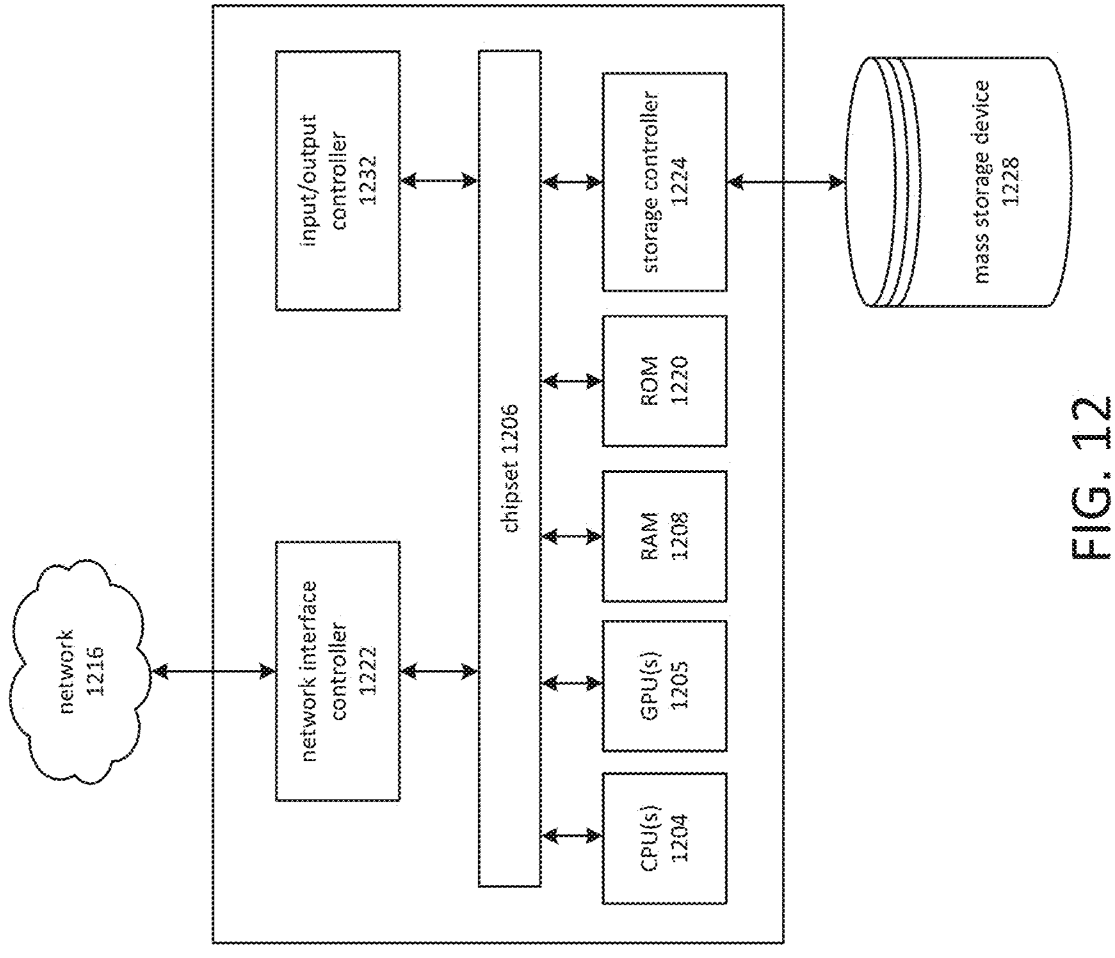
FIG. 12 shows an example computing device which may be used to perform any of the techniques disclosed herein.

FIG. 12 illustrates a computing device that may be used in various aspects, such as the networks and/or devices depicted in FIGS. 1-6. With regard to the example system of FIG. 1, the XR device 101 and the non-XR device 104 may each be implemented by one or more instance of a computing device 1200 of FIG. 12. The computer architecture shown in FIG. 12 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1200 may include a baseboard, or "motherboard," which is a printed circuit board to which a multitude of components or devices may be connected by way of a system bus or other electrical communication paths. One or more central processing units (CPUs) 1204 may operate in conjunction with a chipset 1206. The CPU(s) 1204 may be standard programmable processors that perform arithmetic and logical operations necessary for the operation of the computing device 1200.

The CPU(s) 1204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1204 may be augmented with or replaced by other processing units, such as GPU(s) 1205. The GPU(s) 1205 may comprise processing units specialized for but not necessarily limited to highly parallel computations, such as graphics and other visualization-related processing.

A chipset 1206 may provide an interface between the CPU(s) 1204 and the remainder of the components and devices on the baseboard. The chipset 1206 may provide an interface to a random-access memory (RAM) 1208 used as the main memory in the computing device 1200. The chipset 1206 may further provide an interface to a computer-readable storage medium, such as a read-only memory (ROM) 1220 or non-volatile RAM (NVRAM) (not shown), for storing basic routines that may help to start up the computing device 1200 and to transfer information between the various components and devices. ROM 1220 or NVRAM may also store other software components necessary for the operation of the computing device 1200 in accordance with the aspects described herein.

The computing device 1200 may operate in a networked environment using logical connections to remote computing nodes and computer systems through local area network (LAN). The chipset 1206 may include functionality for providing network connectivity through a network interface controller (NIC) 1222, such as a gigabit Ethernet adapter. A NIC 1222 may be capable of connecting the computing device 1200 to other computing nodes over a network 1216. It should be appreciated that multiple NICs 1222 may be present in the computing device 1200, connecting the computing device to other types of networks and remote computer systems.

The computing device 1200 may be connected to a mass storage device 1228 that provides non-volatile storage for the computer. The mass storage device 1228 may store system programs, application programs, other program modules, and data, which have been described in greater detail herein. The mass storage device 1228 may be connected to the computing device 1200 through a storage controller 1224 connected to the chipset 1206. The mass storage device 1228 may consist of one or more physical storage units. The mass storage device 1228 may comprise a management component 1210. A storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1200 may store data on the mass storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1228 is characterized as primary or secondary storage and the like.

For example, the computing device 1200 may store information to the mass storage device 1228 by issuing instructions through a storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1200 may further read information from the mass storage device 1228 by detecting the physical states or characteristics of one or more particular locations within the physical storage units.

In addition to the mass storage device 1228 described above, the computing device 1200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1228 depicted in FIG. 12, may store an operating system utilized to control the operation of the computing device 1200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1228 may store other system or application programs and data utilized by the computing device 1200.

The mass storage device 1228 or other computer-readable storage media may also be encoded with computer-executable instructions, which, when loaded into the computing device 1200, transforms the computing device from a general-purpose computing system into a special-purpose computer capable of implementing the aspects described herein.

These computer-executable instructions transform the computing device 1200 by specifying how the CPU(s) 1204 transition between states, as described above. The computing device 1200 may have access to computer-readable storage media storing computer-executable instructions, which, when executed by the computing device 1200, may perform the methods described herein.

A computing device, such as the computing device 1200 depicted in FIG. 12, may also include an input/output controller 1232 for receiving and processing input from a number of input devices, such as a keyboard, a mouse, a touchpad, a touch screen, an electronic stylus, or other type of input device. Similarly, an input/output controller 1232 may provide output to a display, such as a computer monitor, a flat-panel display, a digital projector, a printer, a plotter, or other type of output device. It will be appreciated that the computing device 1200 may not include all of the components shown in FIG. 12, may include other components that are not explicitly shown in FIG. 12, or may utilize an architecture completely different than that shown in FIG. 12.

As described herein, a computing device may be a physical computing device, such as the computing device 1200 of FIG. 12. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of implementing seamless interactions across extended reality (XR) and non-XR platforms, comprising:

establishing a connection between the extended reality (XR) platform and the non-XR platform, wherein the XR platform comprises an XR device, and the non-XR platform comprises a non-XR device;

receiving user input via an input mechanism associated with a first one of the XR device and the non-XR device;

converting position information associated with the user input to be executable by a second one of the XR device and non-XR device, the second one being different from the first one; and implementing controls across the XR platform and the non-XR platform without switching the input mechanism associated with the first one of the XR device and the non-XR device to an input mechanism associated with the second one of the XR device and non-XR device.

2. The method of claim 1, wherein an input mechanism associated with the non-XR device comprises a mouse, a keyboard, or a touch screen.

3. The method of claim 1, further comprising:

moving an object across a border between a display area of the non-XR device and an XR space of the XR platform based on user input received via an input mechanism associated with the non-XR device.

4. The method of claim 3, further comprising:

continuing to control the object in the XR space using the input mechanism associated with the non-XR device, wherein a cursor associated with the non-XR device moves across the border and into the XR space.

5. The method of claim 1, further comprising:

converting the position information associated with the user input to a three-dimensional (3D) spherical coordinate system corresponding to the XR platform in response to receiving the user input via an input mechanism associated with the non-XR device.

6. The method of claim 1, wherein an input mechanism associated with the XR device comprises a component configured to track user gestures or an XR controller.

7. The method of claim 1, further comprising:

moving an object across a border between an XR space of the XR platform and a display area of the non-XR device based on user input received via an input mechanism associated with the XR device.

8. The method of claim 1, further comprising:

controlling an object displayed in a display area of the non-XR device based on user input received via an input mechanism associated with the XR device.

9. The method of claim 1, further comprising:

determining a hit point of the user input casting on a two-dimensional (2D) display area in the XR platform and computing 2D coordinates of the hit point in response to receiving the user input via an input mechanism associated with the XR device, wherein the 2D display area corresponds to a screen recording of the non-XR device streamed into the XR platform.

10. The method of claim 1, wherein the non-XR device comprises at least one of a laptop, a personal computer (PC), or a mobile device.

11. The method of claim 1, wherein the XR device comprises at least one of a virtual reality (VR) device, an augmented reality (AR) device, or a mixed reality (MR) device.

12. A system comprising:

one or more computer processors; and one or more computer memories comprising computer-readable instructions that upon execution by the one or more computer processors, configure the system to perform operations comprising:

establishing a connection between an extended reality (XR) platform and a non-XR platform, wherein the XR platform comprises an XR device, and the non-XR platform comprises a non-XR device;

receiving user input via an input mechanism associated with a first one of the XR device and the non-XR device;

converting position information associated with the user input to be executable by a second one of the XR device and non-XR device, the second one being different from the first one; and implementing controls across the XR platform and the non-XR platform without switching the input mechanism associated with the first one of the XR device and the non-XR device to an input mechanism associated with the second one of the XR device and non-XR device.

13. The system of claim 12, the operations further comprising:

moving an object across a border between a display area of the non-XR device and an XR space of the XR platform based on user input received via an input mechanism associated with the non-XR device.

14. The system of claim 13, the operations further comprising:

continuing to control the object in the XR space using the input mechanism associated with the non-XR device.

15. The system of claim 12, the operations further comprising:

moving an object across a border between an XR space of the XR platform and a display area of the non-XR device based on user input received via an input mechanism associated with the XR device.

16. The system of claim 15, further comprising:

continuing to control the object displayed in the display area of the non-XR device using the input mechanism associated with the XR device.

17. The system of claim 12, wherein an input mechanism associated with the non-XR device comprises a mouse, a keyboard, or a touch screen, and wherein an input mechanism associated with the XR device comprises a component configured to track user gestures or an XR controller.

18. A non-transitory computer-readable storage medium, storing computer-readable instructions that upon execution by a processor cause the processor to implement operations comprising:

establishing a connection between an extended reality (XR) platform and a non-XR platform, wherein the XR platform comprises an XR device, and the non-XR platform comprises a non-XR device;

receiving user input via an input mechanism associated with a first one of the XR device and the non-XR device;

converting position information associated with the user input to be executable by a second one of the XR device and non-XR device, the second one being different from the first one; and implementing controls across the XR platform and the non-XR platform without switching the input mechanism associated with the first one of the XR device and the non-XR device to an input mechanism associated with the second one of the XR device and non-XR device.

19. The non-transitory computer-readable storage medium of claim 18, the operations further comprising:

moving an object across a border between a display area of the non-XR device and an XR space of the XR platform based on user input received via an input mechanism associated with the non-XR device; and continuing to control the object in the XR space using the input mechanism associated with the non-XR device.

20. The non-transitory computer-readable storage medium of claim 18, the operations further comprising:

moving an object across a border between an XR space of the XR platform and a display area of the non-XR device based on user input received via an input mechanism associated with the XR device; and continuing to control the object displayed in the display area of the non-XR device using the input mechanism associated with the XR device.

* * * * *